Aug. 29, 1961  A. B. PENNALA ET AL  2,997,775
METHOD OF MAKING BEARINGS
Filed April 20, 1959  2 Sheets-Sheet 1
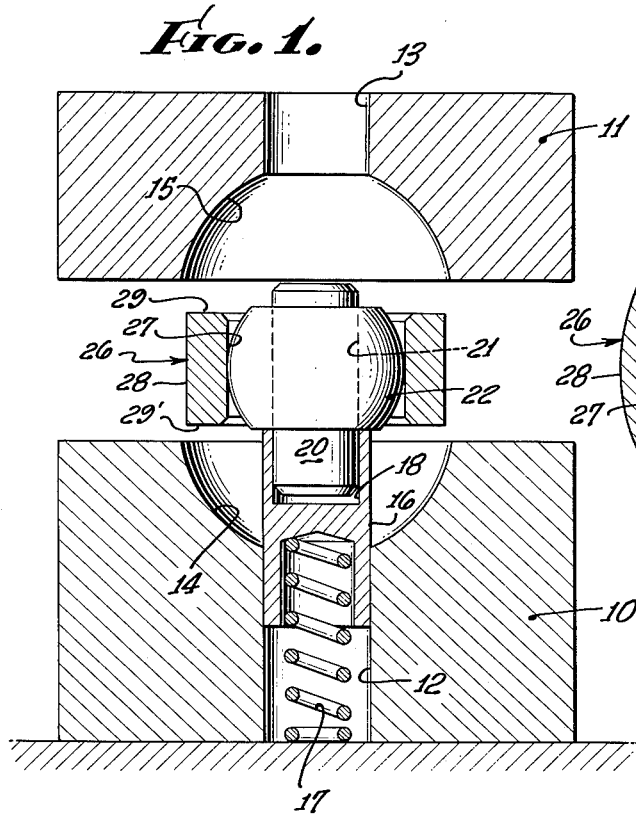
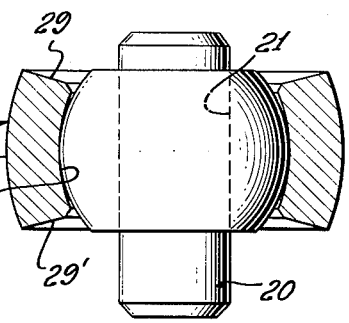
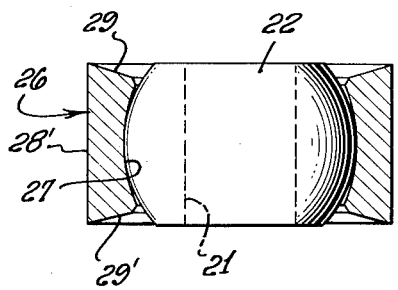
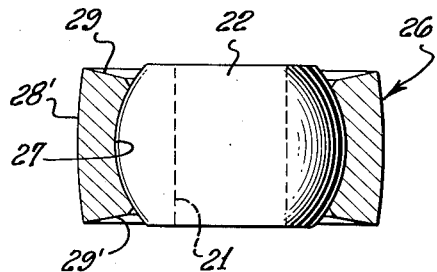
INVENTORS.
ARTHUR B. PENNALA
EDWARD SAHAGIAN
FREDERICK A. STRAUB
BY
Miketta and Glenny
ATTORNEYS.

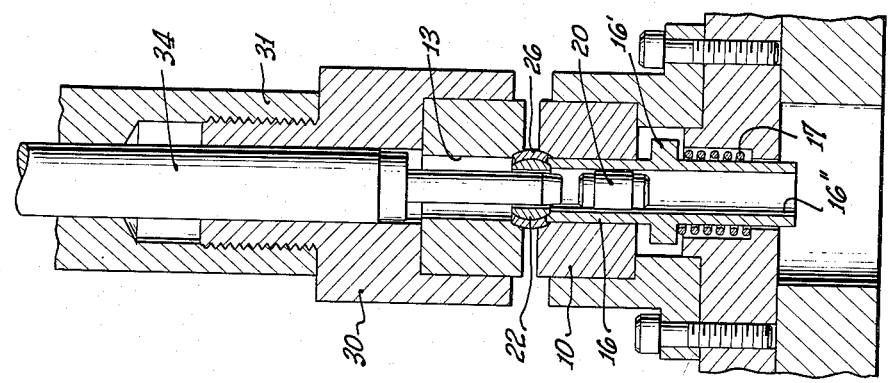
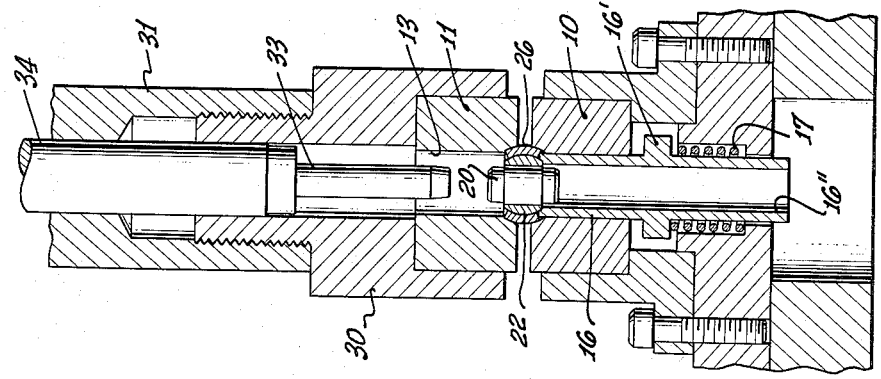
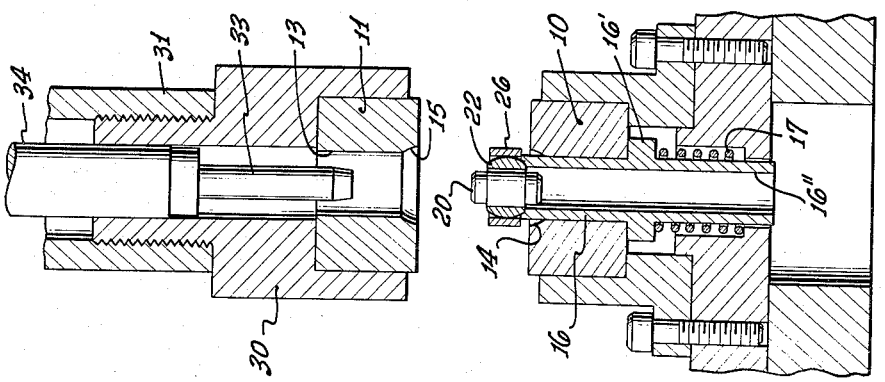
INVENTORS.
ARTHUR B. PENNALA
EDWARD SAHAGIAN
FREDERICK A. STRAUB
BY
Miketta and Glenny
ATTORNEYS.

United States Patent Office 2,997,775
Patented Aug. 29, 1961

2,997,775
METHOD OF MAKING BEARINGS
Arthur B. Pennala, Sunland, Calif., Edward Sahagian, Pottsville, Pa., and Frederick A. Straub, Los Angeles, Calif., assignors, by mesne assignments, to Kahr Bearing Corporation, Burbank, Calif., a corporation of California
Filed Apr. 20, 1959, Ser. No. 807,686
14 Claims. (Cl. 29—149.5)

This invention relates to improvements in methods of making self-aligning bearings and is particularly directed to methods which simplify the manufacturing operations and eliminate the human element and variations or deviations which result therefrom. The invention is particularly directed to the production of self-aligning bearings (consisting essentially of a centrally disposed spherical member or ball and an outer member or race) wherein a virtually uniform clearance is attained between the inner ball-shaped member and the inner surface of the encircling race.

Bearings of the type herein referred to are of rather ancient origin and various methods of manufacturing them have been disclosed in the prior art, as for example, in Patent 1,693,748 of 1928. That an annular ring could be press-formed around a ball-shaped member to provide a socket in which the ball may rotate has also been known for a long time (see Patent 1,793,874). Whether the internal surface of the outer race blank is provided with a cylindrical surface substantially equal in diameter to the diameter of the ball or whether such internal surface of the race blank is provided with a preformed or pre-honed socket in the form of a spherical zone having substantially the same radius as that of a ball which is to be used therein and a confluent cylindrical surface, does not materially affect the ultimate results attained but may influence cost of production. In all of these methods of making self-aligning bearings it was desired that a relatively uniform bearing clearance be obtained between the inner ball-shaped member and the inner surface of the encircling race. Whether the external race member was poured in place, press-formed or coined around the ball, a very intimate engagement or physical contact was established between at least portions of the race and the ball, this engagement preventing the ball from rotating freely within its race. As a result, mechanics have utilized the time-honored custom of hammering the outside of the race or the ball in order to enlarge the cavity in which it rotates, as for example, in Patents 2,252,351 and 2,476,728. The application of these forces to the outer race, whether by hammering or by a rolling pressure, involves pont-to-point contact and the human element. As a result, the clearances developed have not been uniform. Moreover, it is to be remembered that when press-forming operations are employed and the metal of the outer race is a hard or even a hardened and tempered steel, a considerable amount of springback occurs at the opposite end portions of the race, the end portions of the race springing back and developing a separation between the inner surface and the ball in regions adjacent the ends of the race which is materially greater than the clearance between the medial portion of a race and the outer surface of the contained ball.

An object of the present invention is to disclose and provide improved methods of making self-aligning bearings whereby a virtually uniform clearance is developed between an inner ball-shaped member and the inner surface of an encircling race.

A further object of the invention is to disclose and provide an improved method of making self-aligning bearings of the ball-type and race-type wherein hammering or other point-to-point or highly localized application of forces is dispensed with.

A still further object of the invention is to disclose and provide a novel method of making self-aligning bearings wherein the inherent resiliency and elasticity of metals are employed to best advantage.

These and various other objects and advantages of the present invention will be described in relation to an exemplary form of apparatus and sequence of operations. In order to facilitate understanding, reference will be had to the appended drawings, in which:

FIG. 1 is a somewhat diagrammatic representation of a pair of dies in operative relation to a ball and race blank arrangement immediately prior to an initial forming step.

FIG. 2 is an assembly of ball and partially formed race around upon being removed from the press illustrated in FIG. 1.

FIG. 3 is another view illustrating a subsequent step which may be carried out whereby the outer surface of the race is machined.

FIG. 4 illustrates an assembly of ball and race after a secondary forming operation.

FIGS. 5, 6 and 7 illustrate forming dies and expansion pin ejection means embodied therein for use in the method of this invention.

It is to be understood that bearings of the type herein referred to may vary greatly in size and in materials. The ball or inner ball-shaped member is generally made from a ball-bearing type of steel, heat-treated to a hardness on the order of Rockwell C55 to 62 and very often highly polished and plated in some instances. The external race may be made from any suitable material; bronze, brass, aluminum bronze, stainless steel or tempered or hardened steels are often employed. In most instances the inner, ball-shaped member is provided with an axial bore. The diameter of the bore may vary; on small bearings a very small bearing of, say, 0.25 in. is often employed. In larger bearings such as those employing a ball having a diameter of 1.5 in. the axial bore may range from about 0.75 in. to as high as 1.25 in. Obviously the width and thickness of the race may also vary. All of these variables must be taken into consideration in determining the best bearing to employ in a given piece of machinery or for a particular load or temperature condition. The inner surface of the outer race ring may be provided with an oil groove or grooves, oil holes or the like. The desired bearing clearance between the inner surface of the race and the outer surface of the ball may also vary, depending upon the particular use to which the bearing is to be put. Ordinarily, these clearances are of the order of 0.0005 in. to about 0.003 in., although ordinarily it is desirable to maintain such clearance for normal purposes and uses on the order of about 0.001 in. or 0.002 in.

An exemplary mode of operation will now be described. Generally stated, the steps of the method may comprise first fitting an expansion pin into the axial bore of the ball so as to cause the ball to expand uniformly and increase in diameter about 0.002 in. It is to be understood that this specific example is simply illustrative and not limiting. Thereafter, the expanded ball-expansion pin assembly is placed within the race blank. The internal diameter of the race blank should be such as to permit the ball to be readily inserted with a snug fit. The race blank, together with its contained ball-pin assembly, is then placed into a suitable press provided with opposing cup-shaped dies. The dies are brought together around the race-ball-pin assembly and pressure is exerted upon the outer end portions of the race ring so as to form the race toward the ball. At the conclusion of this press-forming operation the inner surfaces of the race ring adjacent its ends remain in proximity to the surface of the ball but are normally spaced therefrom by a distance greater than a desired bearing clearance after such press-forming.

The outer surface of the race ring is now preferably machined so as to reduce its thickness. The greatest reduction in thickness will take place at the median portion or in a median zone of the race ring. Thereafter, a secondary press-forming operation is performed in the absence of the expansion pin. At the conclusion of this secondary press-forming operation it will be found that the end portions of the outer race ring have been brought closer to the external surface of the ball and substantially the entire inner surface of the race ring is now at a desired bearing clearance from the surface of the ball.

The schematic arrangement illustrated in FIG. 1 comprises a lower die member 10 and an upper die member 11, both provided with axial bores such as 12 and 13 and opposing spherical, concave surfaces 14 and 15. The lower die shown in FIG. 1 contains a cylindrical locating pin 16 slidably mounted in the bore 12 and upwardly biased by means of the spring 17. The upper end of this locating pin 16 is shown counterbored so as to form a socket 18 adapted to receive the end of an expansion pin 20.

In the typical arrangement shown in FIG. 1, the expansion pin 20 has been press-fitted into the axial bore 21 of the ball 22. The diameter of the pin 20 is sufficiently large to expand the ball 22 and increase its diameter. For example, a ball having an initial diameter of 1.0632 may be readily temporarily expanded to 1.0642 or 1.0652 in outer diameter without fracturing or damaging the ball even though it is of ball-bearing steel and has a hardness of Rockwell C60.

An outer race ring generally indicated at 26 and having a cylindrical inner surface 27, an outer cylindrical surface 28, end faces 29 and 29' and internal chamfered edges as illustrated is now placed around the ball-expansion pin assembly. The inner diameter of the race ring 26 is normally substantially equal to that of the expanded ball so that the race may be easily placed around the ball without the use of force; it may be termed a snug fit.

It will be noted that the pin 20 is longer than the axial bore of the ball 22 and extends therebeyond. The end of the expansion pin 20 is received within the socket 18 of the locating pin 16. Preferably the socket is sufficiently deep so as to readily accommodate the pin and permit the flats on one end of the ball to rest against the end of the locating pin 16, as illustrated in FIG. 1. Outer end portions of the locating pin may also support the ring, thereby positively locating the ball within the race.

The dies 10 and 11 are carried by a hydraulic press and are brought together by suitably applied hydraulic pressure. The concave spherical surfaces 14 and 15 contact outer edge portions of the ring 26 and press-form the ring toward the ball. It may be noted that the radius of curvature of each of these concave surfaces such as the surface 14 has its center located slightly above the top of the die 10 so that at no time will the opposing surfaces of the dies 10 and 11 actually come in contact, but instead will always remain spaced, even at the conclusion of a press-forming operation. A narrow conical or chamfered portion may exist between each spherical surface and the top of its die.

The amount of pressure applied during this press-forming operation will depend, of course, upon the size of the bearing and the metal employed in the race, as well as its width and thickness. A skilled mechanic may, after one or two preliminary runs, readily determine the pressure which is to be used thereafter in the commercial production of large numbers of identical bearings.

At the end of this initial press-forming operation the dies are separated and the race-ball-pin assembly is withdrawn. This assembly will appear somewhat as shown in FIG. 2, it being understood that FIG. 2 exaggerates the spacing between the end portions of the race member and the surface of the ball. In actual practice on bearings of larger sizes the spacing between the inner surface of the race adjacent its ends and the surface of the ball may be on the order of 0.004 in., permitting a feeler gauge of that size to be inserted.

In such instances the process is then continued by machining the outer surface 28 of the partially formed race to a cylindrical surface having a diameter but a few thousandths larger than the final diameter desired. Fig. 3 illustrates the assembly with the race 26 now provided with a machined, cylindrical outer surface 28'. It will be noted that in FIG. 3 the clearance between the end portions of the inner surface of the race and the ball is still exaggerated.

Finally, the assembly of ball and race, as shown in FIG. 3, with the pin withdrawn from the bore of the ball, is again press-formed in a press of the same character as is illustrated in FIG. 1. A loose pin may be inserted in the bore of the ball for the purpose of positioning only. The pressure employed during the second forming operation does not exceed the pressures originally employed, and, ordinarily, a lower pressure will suffice to bring the end portions of the inner surface of the race into desired bearing clearance of the surface of the ball. FIG. 4 exemplifies the appearance of the race with respect to the ball at the end of this secondary forming operation. The external surface of the race may be very slightly convex and such convexity may be readily removed by the final grinding operation to finished cylindrical size. The end faces of the race are generally machined and made parallel. It will be found that no loosening, hammering or other manipulation is necessary. A desired, substantially uniform clearance on the order of between about 0.001 in. and 0.002 in. or 0.0025 in. will exist between the ball 22 and the race 26.

In order to afford some guidance as to pressures employed with different size bearings, the following tabulation shows the effect obtained by utilizing balls of diameters having bores of different diameters and having the outer rate machined to stated diameters. In all instances the ball was of 52100 steel which had been heat-treated, and the race was of 4130 steel heat-treated. It will be noted that the final or secondary forming operation was carried out at lower pressures in two instances and at an equal to that used in the initial press-forming in one instance.

| Diameter | | | Forming Pressure | |
| --- | --- | --- | --- | --- |
| Ball | Bore | Machined Outer Race | Initial With Pin, lbs. | Final Without Pin, lbs. |
| 1.312 | 0.875 | 1.575 | 2,500 | 1,900 |
| .968 | 0.625 | 1.2 | 1,100 | 1,100 |
| .812 | 0.500 | 1.01 | 1,000 | 500 |

Attention is drawn to the fact that the machining of the outer surface of the race (after the initial press-forming operation) may be carried out with the expansion pin 20 still within the axial bore of the ball 22. In order to facilitate such machining, the ends of such pin may be provided with centers. Moreover, it is to be noted that on many of the larger sized bearings, the initial press-forming operation actually causes a binding engagement between the median zone of the inner surface of the ring and the ball. Even though the expansion pin 20 is withdrawn from the axial bore of the ball, such binding engagement may persist. However, the secondary press-forming operation not only brings the end portions of the inner surface of the race into bearing clearance with the ball, but simultaneously relieves the binding engagement in the median zone of such inner surface of the race and the ball. The method of the present invention therefore employs physical properties of materials in a novel manner.

It may also be noted that the machining of the outer surface of the race 26 referred to hereinabove may not necessarily be machining to a cylindrical surface. On many very large bearings it has been found desirable to machine the outer surface 28 into a somewhat concave surface 28' before re-pressing. This is particularly true on large bearings with wide races.

On small bearings and particularly on bearings where the diameter of the axial bore is relatively large in comparison with the diameter of the ball itself, the method hereinabove disclosed may be somewhat simplified in that it need only comprise the steps of press-fitting an expansion pin into the ball to impart a desired expansion or increase in diameter of, say, 0.002 in., followed by a press-forming operation as heretofore described in connection with FIG. 1, and then concluded by the withdrawal of the expansion pin from the ball-race assembly. Upon withdrawing the pin (this operation may take place in the press) it will be found that a desired bearing clearance has been obtained because the ball returns to its original unexpanded diameter, so that a finished bearing is discharged from the press. It is to be remembered that for many commercial uses it is not necessary that the total or entire inner surface of the race be spaced a uniform, constant clearance from the ball; it is only commercially necessary that, say, 60% of the inner surface of the race be within a workable bearing clearance on the order of 0.002 in. or 0.0025 in. or even 0.003 in. from the ball. In other instances, the process may comprise the essential press-fitting of the expansion pin into the ball in order to expand the same, followed by a preliminary press-forming, followed by a withdrawal of the pin and a secondary or final press-forming, and all of these operations may take place in a press of the type hereafter described. Again, machining of the outer surface may be dispensed with between the initial and final press-forming operations. Final machining to a desired external diameter of the race and facing of ends of the race may be the last steps of the process.

Moreover, it is to be definitely understood that in the event any intermediate machining of the external surface of the race is deemed necessary or desirable, it may be conducted on such outer surface with the pin pressed into the ball or withdrawn from the ball.

These various slight modifications of the method are very important in that they permit the method to be utilized in the production of extremely accurate bearings for highly specialized installations and to very strict specifications (as in scientific equipment, very delicate or accurate machinery or for extremely heavy loads in critical apparatus). The method is also applicable to commercial bearings for use in tractors and other pieces of equipment where extreme accuracy is secondary but utility and economy are more important factors.

FIGS. 5, 6 and 7 illustrate a production type of press for use in carrying out the method of this invention. Similar numbers will be applied to parts heretofore described. The lower and upper dies 10 and 11 are again provided with opposing concave forming surfaces 14 and 15. FIG. 5 illustrates the dies in open position, assumed when the lower locating pin 16 is either receiving the ball 22 with its expansion pin 20 and the ring blank 26 or is ready to discharge or unload the completed bearing. The locating pin 16 is upwardly biased by spring 17 and is shown provided with an annular flange 16' for limiting upward movement of the pin. Moreover, the locating pin 16 shown in FIGS. 5, 6 and 7 is provided with a through bore 16".

The upper die 11 is also provided with a through bore 13 and is held in a die holder 30 operably connected to a primary hydraulic ram 31. Movable through the die 11 is a knock-out pin 33 operably associated with a secondary hydraulic ram 34.

After the expanded ball 22 with its pin 20 has been positioned on the upper end of locating pin 16 and the race ring blank 26 has been placed therearound, the primary upper ram moves downwardly into the position indicated in FIG. 6. The race ring blank 26 is preformed around the expanded ball. After the desired amount of pressure has been applied to the race ring blank, this pressure is relieved but the ram is not raised; the pressure is relieved to "zero" pressure so as to hold the formed bearing in position. The secondary hydraulic ram 34 is now energized and the knock-out pin 33 (which has a diameter slightly smaller than the expansion pin 20) is brought down so as to push the expansion pin 20 out of the formed bearing. This knocking out operation is illustrated graphically in FIG. 7. Thereafter the knock-out pin 33 is withdrawn (by actuating the secondary hydraulic ram 34) and two alternative operations can take place: (a) the upper die 11 may also be raised, permitting the spring-biased locating pin 16 to raise the formed bearing into unloaded position, the bearing now being in finished form with a desired clearance between the ball and the race so that the race-ball assembly can now be removed and finally subjected to whatever external machining or trimming may be desired, or (b) after the expansion pin 20 has been knocked out the primary ram 30 may again be energized (so as to impose additional pressure and a secondary forming operation upon the race) and then raised so as to discharge a finished bearing.

As previously indicated, whether a secondary pressing operation is necessary or not depends greatly upon the physical properties and characteristics of the metal used for the race, its width, the thickness of the race to be formed or desired by the customer, and the ultimate bearing clearance specified by the engineer for the particular job or use to which the bearing is to be put. The pressing arrangement illustrated in FIGS. 5, 6 and 7 is extremely flexible, since all of the operations referred to hereinabove may be carried out in a single unit or piece of equipment.

It is to be noted that the entire manufacturing operations can be carried out at normal room temperatures, with readily available tools and equipment, and without reliance upon grit-collecting greases or sensitive touch or skill of an individual (whose touch, skill or strength and judgment may vary from hour to hour). Completely reproducible results are attained and the resulting bearings exhibit uniform radial clearance at all angles in a plane transverse to the axis of the race. Moreover, the method is applicable not only to the manufacture of bearings wherein the outer race blank is tubular; such race blank may have a preformed, semispherical zone therein, or it may be provided with a shank (resulting in a rod-end type of bearing) or the race blank may be plated with a different metal or with a friction-reducing organic or metallo-organic plastic or composition.

All changes and modifications coming within the scope of the appended claims are embraced thereby.

We claim:

1. In an improved method of making self-aligning bearings whereby a virtually uniform clearance between an inner ball-shaped member and the inner surface of an encircling race is attained, the steps of: press-fitting into a ball-shaped member having an axial bore an expansion pin of larger diameter than said bore to cause said ball-shaped member to temporarily expand without permanently deforming such member; placing said ball-shaped member and expansion pin assembly within an outer race member; press-forming the outer race member around said assembly to cause permanent deformation of said race member, end portions of said race member remaining in proximity to the surface of said ball but spaced therefrom by a distance greater than a desired bearing clearance after such press-forming; machining the outer surface of said press-formed outer race member to materially reduce the thickness of said race member in a medial zone; and then press-forming end portions of said race member inwardly toward the ball in the absence of said expansion pin to reduce the distance separating the inner surface of such race member in the region of said end portions from the surface of the ball-shaped member to a desired bearing clearance.

2. A method as stated in claim 1 wherein the last-mentioned press-forming operation is carried out at a lower pressure than the first-mentioned press-forming operation.

3. A method as stated in claim 1 wherein the outer surface of the press-formed outer race member is machined to cylindrical form.

4. A method as stated in claim 1 wherein the outer surface of the press-formed outer race member is machined to produce a concave surface thereon between the initial press-forming operation and the last-named press-forming operation.

5. In an improved method of making self-aligning bearings, the steps of: forcing into the axial bore of a ball-shaped bearing member an expansion pin of greater diameter than said axial bore to cause a temporary increase in the diameter of said ball-shaped bearing member of between 0.0015 in. and 0.0025 in.; press-forming an annular race ring around said ball and pin assembly; and then withdrawing said pin.

6. A method as stated in claim 5 including the step of again press-forming the race ring around the ball after withdrawal of said pin.

7. A method as stated in claim 5 including the step of machining the outer surface of the race ring prior to withdrawal of said pin.

8. A method as stated in claim 5 including the step of machining the outer surface of the race ring prior to the second press-forming operation.

9. A method as stated in claim 5 wherein the annular race ring blank, prior to press-forming, has an inner cylindrical surface having a diameter virtually equal to that of the expanded ball-shaped member and such race ring blank is provided with oppositely inclined frusto-conical end faces.

10. A method as stated in claim 5 wherein the annular race ring blank, prior to press-forming, is of metal and has an inner cylindrical surface coated with a hard, friction reducing organic synthetic plastic composition, said coated cylindrical surface having a diameter virtually equal to that of the ball-shaped member.

11. An improved method of making self-aligning bearings, comprising: forcing into the axial bore of a ball-shaped metallic bearing member a cylindrical expansion pin of greater diameter than said bore to cause an increase in the diameter of said ball-shaped member of between 0.0015 in. and 0.0025 in. without permanently deforming such member; placing an annular, metallic race ring blank having an inner diameter virtually equal to the outer diameter of the expanded ball-shaped member around said ball in a forming zone, the external diameter of said race ring blank exceeding a desired finished diameter; press-forming said race ring blank around said ball member and its expansion pin in said forming zone to permanently deform the metal of said race ring blank to irremovably contain said ball; and removing the expansion pin from the bore in the ball-shaped member while said member and race ring are in said forming zone.

12. A method as stated in claim 11 including the steps of applying inwardly directed forming pressure to outer portions of the race ring blank during press-forming and then reducing said forming pressure during removal of said expansion pin.

13. A method as stated in claim 11 including the steps of applying inwardly directed forming pressure to outer portions of the race ring blank during said press-forming; then reducing such forming pressure to facilitate withdrawal of said expansion pin from the bore in the ball-shaped member; and again applying forming pressure upon outer portions of the race ring blank in said zone to obtain greater uniformity in bearing clearance between the inner surface of the race ring and the outer surface of the ball-shaped member.

14. In an improved method of making self-aligning bearings whereby a virtually uniform clearance between an inner ball-shaped member and the inner surface of an encircling race is attained, the steps of: press-fitting into a ball-shaped member having an axial bore an expansion pin of larger diameter than said bore to cause said ball-shaped member to temporarily expand without permanently deforming such member, said expansion of said ball-shaped member temporarily increasing the diameter of said ball-shaped member by between about 0.0015 inch and 0.0025 inch placing said ball-shaped member and expansion pin assembly within an outer race member; press-forming the outer race members around said assembly to cause permanent deformation of said race member, end portions of said race member remaining in proximity to the surface of said ball but spaced therefrom by a distance greater than a desired bearing clearance after such press-forming; machining the outer surface of said press-formed outer race member to materially reduce the thickness of said race member in a medial zone; and then press-forming end portions of said race member inwardly toward the ball in the absence of said expansion pin to reduce the distance separating the inner surface of such race member in the region of said end portions from the surface of the ball-shaped member to a desired bearing clearance.

References Cited in the file of this patent

UNITED STATES PATENTS

| | | |
|---|---|---|
| 2,185,483 | Ward | Jan. 2, 1940 |
| 2,210,132 | Searles | Aug. 6, 1940 |
| 2,724,172 | Potter | Nov. 22, 1955 |
| 2,728,975 | Potter | Jan. 3, 1956 |